April 26, 1949.  W. J. PEARCE  2,468,459
APPARATUS FOR PREVENTING OVERSPEEDING
Filed June 15, 1944  3 Sheets-Sheet 1
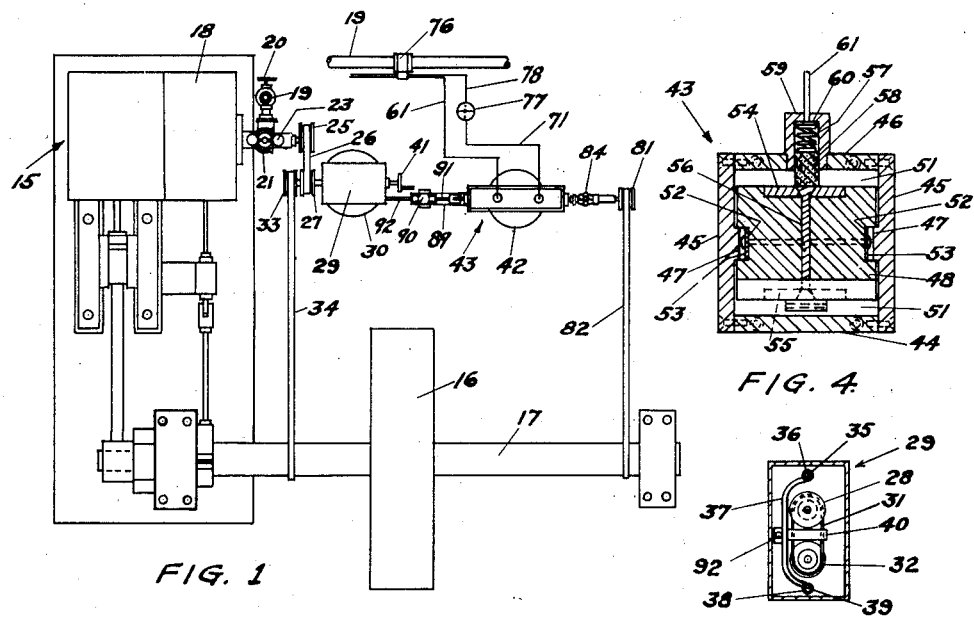
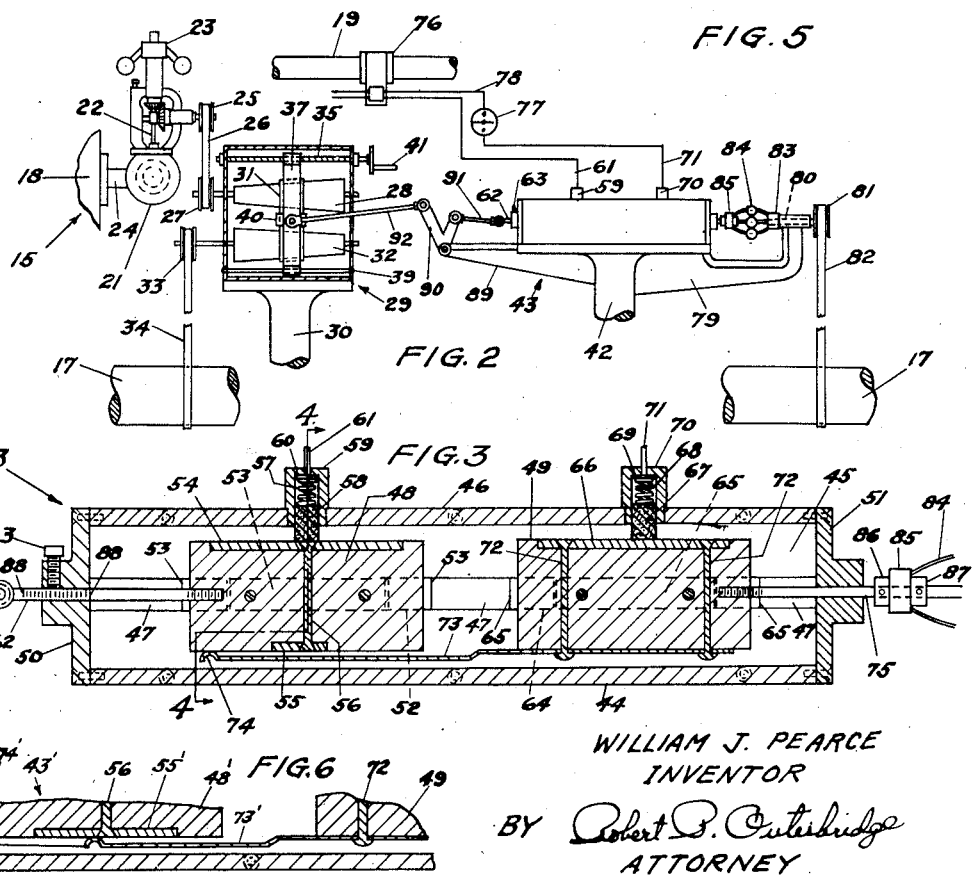
WILLIAM J. PEARCE
INVENTOR
BY Robert B. Outerbridge
ATTORNEY

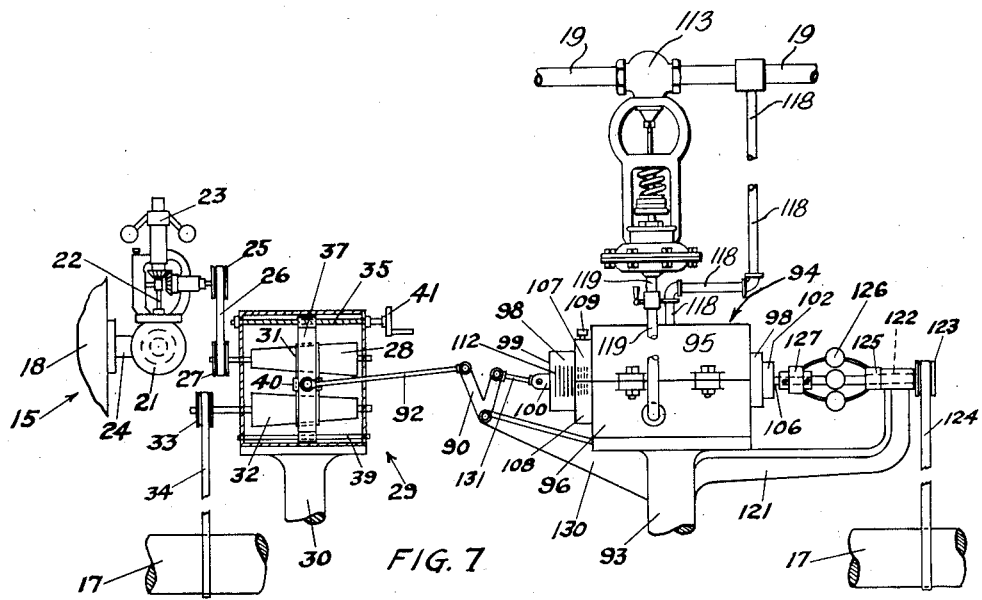

April 26, 1949.  W. J. PEARCE  2,468,459
APPARATUS FOR PREVENTING OVERSPEEDING
Filed June 15, 1944  3 Sheets-Sheet 3

WILLIAM J. PEARCE
INVENTOR

By Robert P. Outerbridge
ATTORNEY

Patented Apr. 26, 1949

2,468,459

UNITED STATES PATENT OFFICE 2,468,459

APPARATUS FOR PREVENTING OVERSPEEDING

William J. Pearce, Arlington, Mass.

Application June 15, 1944, Serial No. 540,412

9 Claims. (Cl. 264—3)

The present invention relates to safety means for stopping power driven devices having flywheels, rotors, or other moving parts to prevent breakage thereof and consequent damage to life and property upon increases in their speeds beyond safe limits. Specifically, the present invention relates to stop mechanisms, sometimes called overspeed trips, for throwing power driven devices out of operation upon a tendency of their moving parts to race. Among the examples of power driven devices which embodiments of the present invention may be employed to stop are steam engines to which the connected line transmits fluid pressure operating power in the form of steam pressure; water wheels to which the connected line transmits fluid pressure operating power in the form of water pressure; and rotor-provided electrical devices such as motors, for example, to which the connected line transmits electricity for operating power.

As is well understood, there is a speed limit beyond which it is not safe for a given flywheel, rotor, or the like to revolve, but for any one of a number of causes, a highly important one being a sudden release of a heavy load upon the power driven device having such moving part, this maximum safe speed may be exceeded, so that overspeed may cause the flywheel, rotor, or the like to explode by centrifugal force. To maintain the speed of certain types of power driven devices practically constant and so prevent overspeeding of a moving element thereof is the function of a governor, for example, but when a governor fails this control against overspeeding is removed. Governors go out of commission for any of a variety of reasons, among these being improper governor design, slipping or breaking of the governor belt or breaking of its pulley, or derangement of the governor mechanism from other causes, such as the sticking of a valve stem, to give one example.

In recognition of the danger to life and property which may follow when a controlling mechanism such as a governor, for example, ceases to work, it has been proposed heretofore to provide stop mechanisms which throw a power driven device out of operation to prevent overspeeding. Such mechanisms are frequently driven from the main shaft of the device but operate independently of its governor so as to function when the governor does not, but so far as I am aware such stop mechanisms are not readily adjustable to permit the use of a given one with any of a plurality of power driven devices each operating at a different normal operational speed, and independently of this situation stop mechanisms marketed today, whether operated electrically, mechanically, or by fluid pressure, are not adapted to use with power driven devices the speed of which may be varied to suit different purposes, as by means of a governor speed regulating mechanism, to give one example.

It is accordingly the principal object of the present invention to provide a stop mechanism or overspeed trip for power driven devices characterized by being readily adjustable, thereby to permit its use interchangeably with any one of a plurality of such devices each running at a different normal operational speed.

It is a further object of the present invention to provide a stop mechanism or overspeed trip which is adjustable to permit its use with a power driven device having means to regulate and vary its speed to any one of a plurality of normal operational speeds.

It is a still further object of the present invention to provide a stop mechanism or overspeed trip of the type and for the use set forth in the next preceding paragraph so constructed that it is itself automatically adjusted for a proper overspeed limit upon actuation of the means for regulating and varying the speed of the power driven device.

To the accomplishment of these objects and of such others as may hereinafter appear, the various features of the present invention reside in certain constructions, combinations, and arrangements of parts all fully described hereinafter and then set forth in the appended claims, possessing advantages which will be readily apparent to those skilled in the art.

The various features of the present invention will be readily understood from reading this specification in the light of the accompanying drawings which illustrate the best forms of the invention at present known to the inventor and in which:

Fig. 1 is a view in plan of a stationary steam engine with an electrically operated embodiment of the present invention in operative combination therewith;

Fig. 2 is an enlarged detail view in elevation of the structure shown in Fig. 1, various parts being cut away;

Fig. 3 is an enlarged detail view in side elevation, partially in section, of the adjustable switch shown in Figs. 1 and 2;

Fig. 4 is an enlarged detail view of the switch in sectional elevation, taken generally along the line 4—4 of Fig. 3;

Fig. 5 is an enlarged detail in side elevation, partially in section, of the governor belt shifting mechanism and associated elements, certain parts being cut away;

Fig. 6 is a detail view in elevation, partially in section, and with certain parts cut away, corresponding to Fig. 3 but showing a modified switch construction adapted for use with a normally closed circuit;

Fig. 7 is a detail view in elevation corresponding to Fig. 2 but showing a fluid pressure operated embodiment of the present invention;

Fig. 8 is an enlarged detail view in side elevation, partially in section, of the adjustable valve shown in Fig. 7;

Fig. 9 is an enlarged detail view of the valve in sectional elevation, taken along the line 9—9 of Fig. 8;

Fig. 10 is an enlarged detail view in plan of the lower half of the housing for the valve;

Figure 11:
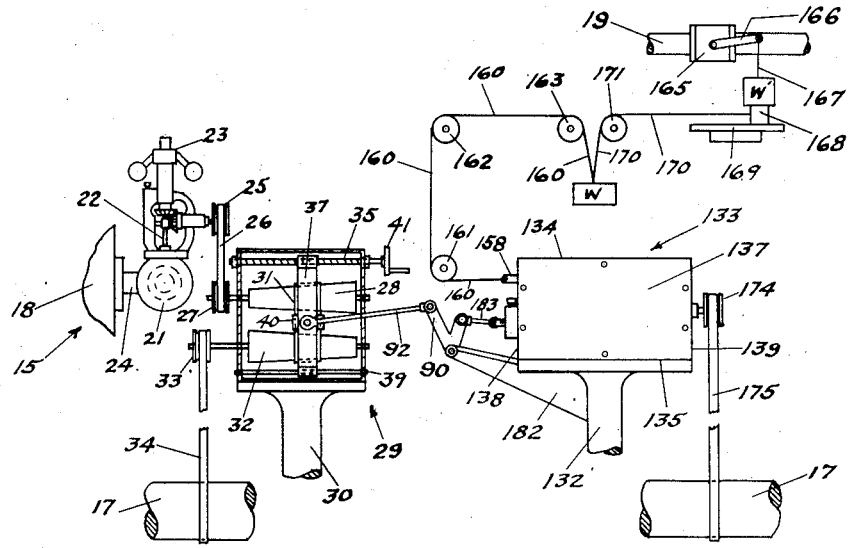
Fig. 11 is a detail view in elevation corresponding to Figs. 2 and 7 but showing a mechanically operated embodiment of the present invention, certain parts being cut away.

Referring to the drawings, there is indicated in Fig. 1 a stationary steam engine 15, this particular type of power driven device being selected merely for purposes of illustration and explanation and not by way of limitation with respect to applicability to use of the present invention. The engine 15 is shown provided with a flywheel 16 and shaft 17 therefor the opposite ends of which are suitably journaled in bearings. In Fig. 1 there are also indicated a connecting rod operated by the shaft 17 through a crank, and also a cross head, piston rod, cylinder, steam chest 18, eccentric mounted on the shaft 17, eccentric rod, and valve stem leading to the valve mechanism (not shown) within the steam chest 18. Steam from a boiler is transmitted through a line 19 in which a manual throttle valve 20 may be located, and from the valve 20 the steam passes to the throttle valve mechanism (not shown) located within a housing 21 (Figs. 1, 2, 7, and 11) and controlled through a valve stem 22 by a flyball governor 23. From the valve housing 21 the steam passes through a pipe connection 24 to the chest 18. The governor 23 is shown merely for illustrative purposes as being of the type in which, upon a decrease in the load, i. e., upon an increase in the engine speed, the centrifugal action of the balls causes the valve stem 22 to descend and throttle the flow of steam to the chest 18, the stem rising and opening the valve in the housing 21 upon an increase in the load, i. e., upon a decrease in engine speed and lessening of the rotative speed of the governor 23—thereby to constrain the engine 15 to a practically constant normal operational speed, as is well understood. The governor shown is suitably geared to be driven by a pulley 25 rotated by a belt 26 passing over a pulley 27 driven by a suitably journaled cone 28 of a double-cone type governor speed regulator 29 supported by a standard 30, and rotation of the cone 28 is effected through a belt 31 driven by the other suitably journaled cone 32 of the regulator 29, a pulley 33 mounted on the cone 32 being driven by a belt 34 passing over the engine shaft 17. The speed of the governor 23 (and therefore of the engine) may be regulated and varied, as is well understood, by shifting the location of the belt 31 longitudinally of the cones 28 and 32, and structure for achieving this result may comprise a threaded shaft 35 (Figs. 2, 5, 7, and 11) suitably journaled in the housing walls of the regulator 29 above the cones, a block 36 (Fig. 5) threaded on the shaft, an arm 37 depending from the block 36 clear of the cones 28 and 32 and provided at its lower end with a block 38 having a sliding fit on a guide rod 39 mounted in the regulator housing parallel with the shaft 35, and brackets 40 outstanding from the opposite sides of the arm 37 and adapted to engage the opposite sides of the belt 31 to shift it in one direction or the other along the cones upon rotation of the shaft 35, which rotation is facilitated by use of a hand wheel 41. All of the above elements may be considered as merely representing types of old and well known constructions, and their structure is not shown in any detail because such detail forms no part of the present invention.

In the embodiment of the invention shown in Figs. 1 through 5, and also in the embodiment of the present invention shown in Fig. 6, an electrically operated stop means or overspeed trip is provided to throw the engine 15 out of operation upon a tendency of the flywheel 16 to race, i. e., to exceed a predetermined rotative speed. To this end a standard 42 is located adjacent the standard 30 and supports at its top an adjustable electric switch indicated generally by the numeral 43 and having a bottom 44 (Figs. 3 and 4), side walls 45, and a top 46, these elements being shown merely for illustrative purposes as plates adapted to be secured together by screws to form a housing. The inner faces of the side walls 45 are provided with longitudinal ridges 47 centrally disposed and of identical construction to form ways for the reception within the switch housing of coacting slide block constructions 48 and 49, and the opposite ends of the switch housing are closed by outwardly bossed plates 50 and 51, respectively, each having a central aperture.

The slide block 48 is made of suitable insulating material, at its opposite sides has grooves 52 (Figs. 3 and 4) adapted to receive the wall ridges 47 for sliding movement therealong within the switch housing, and in each groove 52 there is secured a flat spring 53 the opposite ends of which are outwardly bent to press against the associated ridge 47, thereby to steady the block 48 within the switch housing. At its top the block 48 is provided with an embedded plate 54 made of material adapted to conduct electricity, and a similar but shorter plate 55 is embedded in the bottom of the block 48, these two plates being secured in position and electrically connected by a vertical rivet 56. Pressed against the plate 54 by a coil spring 57 is a brush 58, a retaining cap 59 being provided to hold the spring 57 in operative position and also to hold against the top of the spring a terminal disc 60 to which is attached a wire 61 leading out of the cap. As indicated in Fig. 3, the plate 54 is of sufficient length to permit a considerable sliding movement of the block 48 without a break in the contact of the plate with the brush 58, and it is contemplated in the operation of the present invention that such contact not be broken at all. The structure of the slide block 48 is completed by a rod 62 secured therein and extending outwardly of the left end (viewing Fig. 3) of the switch housing through the aperture in its bossed end plate 50, and for the purpose of securing the block 48 in any one of the different positions it may reach in sliding, as is explained below, the boss on the end plate 50 is provided with a set screw 63 (Fig. 3) adapted to engage the rod 62 to hold it and therefore the block 48 stationary.

The slide block 49, like the block 48, is also made of suitable insulating material, has grooves 64 in the opposite sides thereof corresponding to the grooves 52 in the block 48 and permitting the same sliding function, and in each groove there is secured a flat spring 65 corresponding in structure and function to the springs 53. The block 49 is provided at its top with an embedded plate 66 which corresponds to the plate 54 and which is engaged by a brush 67 identical with the brush 58 and held in engagement with the plate 66 by a coil spring 68, disc 69, and cap 70 construction identical with the corresponding elements 57, 60, and 59, respectively, described above, a wire 71 leading out of the cap 70. The plate 66 is secured to the block 49 by two vertical rivets 72 which are made of conducting material and extend through the block so that their lower ends may secure to the bottom of the block an elongated conductor 73 the free end of which extends to the left (viewing Fig. 3) and is shaped to form a contact member 74 normally spaced from the plate 55 on the block 48 but adapted to contact the plate upon a sliding of the block 49, as is explained below. The structure of the slide block 49 is completed by a rod 75 secured therein and extending outwardly of the right end (viewing Fig. 3) of the switch housing through the aperture in its bossed end plate 51.

It is the function of the switch 43 to stop the engine 15 by causing its supply of steam to be cut off. To this end the wire 61 (Figs. 1, 2, and 3) leading from the cap 59 on the switch 43 is connected to one terminal of a normally open, solenoid-controlled safety valve 76 which may be of any suitable construction and is mounted in the steam line 19 ahead of the valve housing 21, while the wire 71 leading from the cap 70 of the switch 43 is connected to one terminal of a conventionally shown hand switch 77 from the other terminal of which a wire 78 leads to the other terminal of the valve 76. The solenoid of the valve 76 is connected to some suitable source of electric current (not shown), and it will be appreciated that since the contact member 74 (Figs. 3 and 4) is normally out of engagement with the plate 55, as indicated in Fig. 3, the circuit described above is, as a whole, a normally open circuit, this being true even when the hand switch 77 is closed. When, however, the contact member 74 engages the plate 55 (the switch 77 being closed), the above circuit as a whole is closed, thereby energizing the solenoid in the valve 76 to effect its closure and consequent stopping of the transmission of steam therebeyond through the line 19 to stop the engine 15.

The present invention contemplates that the engagement of the contact member 74 with the plate 55 be effected by means controlled by the power driven device, and broadly speaking this means may take any form suitable for the purpose. It is preferred, however, to effect this result in the embodiment of the present invention shown in Figs. 1 through 5 by a governor construction controlled by the engine 15 and operatively connected to the switch 43. To this end the standard 42 supporting the switch 43 may be provided with an outstanding arm 79 the free end of which forms a horizontal bearing for a shaft 80 on the outer end of which a pulley 81 is secured, this pulley being driven by a belt 82 passing around the engine shaft 17 as indicated in Figs. 1 and 2. On the inner end of the shaft 80 there is secured a collar 83 forming one end of a horizontally disposed flyball governor 84 shown merely for illustrative purposes as being of a leaf-spring type, and a sleeve 85 forming the other end of the governor 84 is received loosely by the free end portion of the slide block rod 75 for rotation thereabout, spaced collars 86 and 87 (Fig. 3) being secured to the rod 75 at the opposite sides of the sleeve 85, as best shown in Fig. 3. With the above-described construction, it will be seen that the rotation of the engine shaft 17 is transmitted by the belt 82 to the pulley 81, that rotation of the pulley 81 causes rotation of the governor 84, and that the speed of rotation of the governor 84 is determined directly by the speed of rotation of the engine shaft 17. Inasmuch as the governor collar 83 is fixed to the shaft 80, the centrifugal action of the flyballs of the governor 84 resulting from its rotation causes the flyballs to move away from their axis of rotation, as is well understood, and so causes the governor sleeve 85 to move away from the switch 43 (to the right, viewing Fig. 3) in engagement with the rod collar 87, thereby drawing the rod 75 and the slide block 49 with it. It will be understood, of course, that since the governor 84 is of a leaf-spring type, upon a decrease in its rotation, its sleeve 85 moves to the left (viewing Fig. 3) under the influence of the springs and so moves the slide block 49 to the left by engagement of the sleeve 85 with the collar 86, the slide block 49 always returning to the same position within the switch 43 whenever the governor 84 ceases to rotate, i. e., when the engine 15 is not in operation.

Considering the slide blocks 48 and 49 and their associated elements within the switch 43 as having the relative positions indicated in Fig. 3, and also considering the governor 84 as being either at rest (the engine 15 being stopped) or rotating at a given speed (the engine being in operation), it may well be that upon a starting of the engine, or upon an increase in its speed if already in operation, the amount of movement to the right (viewing Fig. 3) of the slide block 49 effected by the rotating governor 84 will be insufficient to cause engagement of the contact member 74 with the plate 55. If such a condition comes into being or exists, as the case may be, the circuit through the switches 43 and 77 and through the solenoid of the valve 76 remains open and as a consequence the valve 76 itself remains open. If, however, the speed of the engine 15, and therefore of the shaft 17, be increased to an extent sufficient to cause the centrifugal action of the governor 84 to draw the rod 75 far enough out of the casing of the switch 43 so that the contact member 74 engages the plate 55, the above-described circuit closes, thereby effecting a closing of the valve 76 through energization of its solenoid and a stopping of the engine. As the speed of the engine 15 determines the speed of rotation of the governor 84, the closing of the switch 43 is controlled by the engine itself, and it will be noted that this control is effected independently of the engine governor 23.

Looking at the switch construction shown in Fig. 3 in a different light, but in view of the foregoing remarks, the fact that the governor 84 must rotate at a given (predetermined) speed to effect movement of the slide block 49 and therefore of the contact member 74 from the position thereof indicated in Fig. 3, for example, to a position in which the contact member 74 engages the plate 55 on the slide block 48, it will be seen that by varying the position of the slide block 48 with respect to the Fig. 3 position of the slide block 49, the distance between the contact member 74 and the plate 55 may be varied, thereby of necessity causing their engagement to take place at different speeds of the governor 84, since the extent of movement of the slide block 49 varies directly with variations in the speed of the governor 84. Thus, if it be desired that the contact member 74 and the plate 55 do not engage until the engine attains a speed greater than that for which the Fig. 3 showing may be considered as being set, i. e., if it be desired that the above-described circuit not be closed until the engine 15 has achieved a speed greater than that for which the Fig. 3 showing may be considered as being set, the rod 62 may be pushed inwardly of the switch 43 a given (predetermined) amount to move the slide block 48 to the right (viewing Fig. 3), thereby increasing the spacing between the contact member 74 and the plate 55 and as a consequence requiring a greater engine speed, and therefore a greater speed of the governor 84 and travel of its sleeve 85, to move the slide block 49 sufficiently to the right (viewing Fig. 3) to cause the contact member 74 to engage the plate 55 and so close the circuit through the valve 76. Conversely, movement of the slide block 48 to the left (viewing Fig. 3) by pulling the rod 62 outwardly of the switch 43 a given (predetermined) amount decreases the spacing between the contact member 74 and the plate 55, thereby resulting in their engagement upon movement of the slide block 49 to the right (viewing Fig. 3) when the governor 84 attains a speed less than sufficient to effect said contact member and plate engagement for the setting thereof shown in Fig. 3. It will thus be seen that by varying the position of the slide block 48 within the switch 43, the switch as a whole can be adjusted, i. e., conditioned, to effect closing of the solenoid-controlled valve 76 at any one of a plurality of selected speeds of the governor 84, and that since the speed of the governor 84 depends directly upon the speed of the engine 15, the switch 43 as a whole can be adjusted, i. e., conditioned, to effect closing of the valve 76 at any one of a plurality of selected speeds of the engine 15.

To facilitate adjusting the switch 43 to a given one of a plurality of engine speeds, the rod 62 may be provided with a series of calibrations 88 (Fig. 3) associated with numbers (not shown) indicating the R. P. M. at which various adjustments of the switch 43 will effect closing of the circuit and so stopping of the engine. Thus, if the lowest normal operational speed for an engine is decided to be 50 R. P. M., for example, a practicable overspeed limit therefor is 55 R. P. M., and it being determined empirically where the slide block 48 should be located relatively to the slide block 49 when the governor 84 is not rotating so that the contact member 74 engages the plate 55 when the governor 84 attains a speed of 55 R. P. M., a calibration mark is placed on the rod 62 to indicate such setting for the slide block 48. Since the slide block 48 is located further to the right than shown in Fig. 3, thereby to increase the spacing between the contact member 74 and the plate 55 for their engagement at any engine speed greater than that for which the Fig. 3 showing may be considered as being set, a next higher engine normal operational speed is decided upon and then the location of the slide block 48 for engagement of the contact member 74 and the plate 55 at a proper overspeed limit for that next higher normal speed is determined empirically, whereupon a second calibration mark is made, this second mark being located to the left (viewing Fig. 3) of the one first made since the slide block 48 is moved inwardly of the switch 43, i. e., to the right (viewing Fig. 3) to achieve closing of the valve 76 at a greater engine overspeed limit. This empirical determination of the various overspeed limit locations for the slide block 48 may be repeated for greater engine speeds and therefore greater overspeed limits, and while any suitable means may be employed for registry with the calibrations 88, in the illustrated embodiment of the present invention (Fig. 3) these calibrations are adapted to register with the mouth of the passage in the boss of the switch end plate 50. The calibrations 88 are given the locations shown in Fig. 3 merely for illustrative purposes, and these locations are not intended to indicate any particular engine overspeed limits since the locations of particular calibrations in different embodiments of the present invention may vary, depending upon structural design and upon the characteristics of the power driven devices with which embodiments of the present invention may be used.

In the structure so far described the position of the slide block 48 is adjusted as the result of manual movement of the rod 62, and the slide block 48 is maintained in a given position of adjustment by tightening the set screw 63 against the rod. By reason of this construction and that described above it will be seen that the first two of the three principal objects of the present invention are achieved. Stating this differently, with the rod 62 calibrated for setting the slide block 48 to effect engagement of the contact member 74 with the plate 55 at any one of a plurality of engine overspeed limits, the above-described construction may be manually adjusted and used interchangeably to stop at its own overspeed limit any one of a plurality of power driven devices each having a different normal operational speed, and where a given power driven device has means for regulating or varying its speed the above-described construction may be manually adjusted in the same manner as before stated to stop the device at the proper overspeed limit for the particular operational speed for which it may be set by the speed regulating means. It is preferred, however, to provide means for operatively connecting the above-described switch and associated governor construction with the device itself so that the third object of the present invention may be achieved, i. e., so that upon regulation or varying of the speed of a power driven device, as by means of the regulator 29, for example, the switch 43 as a whole is itself automatically adjusted to close the valve 76 at the proper overspeed limit.

The means for achieving this automatic adjustment of the switch 43 may take any form suitable for the purpose, but one such means may comprise an operative connection with the mechanism for shifting the belt 31 (Figs. 2 and 5) where a power driven device such as the engine 15 is employed. To this purpose the standard 42 may be provided with an arm 89 (Figs. 1 and 2) extending in the direction of the engine 15 and at its free end having a bell crank lever 90 pivotally mounted thereon in upright position. The arm of the lever 90 opposite the switch 43 is pivotally connected to one end of a link 91 the other end of which is pivotally connected to the slide block rod 62, and the arm of the lever 90 opposite the engine 15 is pivotally connected to one end of a link 92 the opposite end of which is pivotally connected to the outer side of the arm 37 supporting the brackets 40 forming part of the mechanism for shifting the position of the belt 31 on the cones 28 and 32. With this construction, rotation of the hand wheel 41 in one direction or the other causes movement of the arm 37 longitudinally of the cones 28 and 32 and as a consequence movement of the link 92, swinging of the bell crank lever 90, movement of the link 91, and movement of the rod 62 and of the slide block 48. To refer specifically to the Fig. 2 showing, if it be desired to increase the speed of the governor 23 from the speed for which the belt 31 may be regarded as being set in Fig. 2, and thereby decrease the speed of the engine since an increase in the speed of the governor 23 increases its throttling action, as explained above, the hand wheel 41 is turned to cause the arm 37 to move to the left (viewing Fig. 2) thereby causing the belt 31 to rotate the cone 28, and therefore the governor 23, at an increased speed, and since this leftward movement of the arm 37 causes leftward movement of the link 92, bell crank lever 90, link 91, rod 62, and slide block 48, the spacing between the contact member 74 and the plate 55 is decreased, so that these elements engage each other and so close the circuit through the valve 76 at a lower overspeed limit of the shaft 17 and governor 84 than would be the case for the setting of the belt 31 shown in Fig. 2. On the other hand, should it be desired to decrease the speed of the governor 23 from the speed therefor indicated by the setting of the belt 31 in Fig. 2, and thereby increase the speed of the engine 15 since a decrease in the speed of the governor 23 decreases its throttling action, as explained above, and permits more steam to flow to the steam chest 18, the hand wheel 41 is turned to cause the arm 37 to move to the right (viewing Fig. 2) thereby causing the belt 31 to rotate the cone 28, and therefore the governor 23, at a decreased speed, and since this rightward movement of the arm 37 causes rightward movement of the link 92, bell crank lever 90, link 91, rod 62, and slide block 48, the spacing between the contact member 74 and the plate 55 is increased, so that these elements engage each other and so close the circuit through the valve 76 at a higher overspeed limit of the shaft 17 and governor 84 than would be the case for the setting of the belt 31 shown in Fig. 2. Thus a varying of the speed of the engine 15 by varying the speed of the governor 23 through turning of the hand wheel 41 automatically adjusts the position of the slide block 48 within the switch 43 and so automatically adjusts, i. e., conditions, that switch to close the circuit through the valve 76 and stop the engine 15 at a desired overspeed limit for rotation of the engine shaft 17 and flywheel 16.

The structure shown in Figs. 1 through 5 functions with a normally open circuit through the valve 76 and has been so described. A normally closed circuit may be provided, however, by means of simple changes in the construction of the switch 43. Such changes are indicated in Fig. 6, the switch as a whole being there indicated by the numeral 43', and to this end a slide block 48', in all other respects identical with the slide block 48, is provided with a bottom plate 55' which has the function of the plate 55 but extends lengthwise along the major portion of the block 48'. In addition, the slide block 49 is provided with a conductor 73' in all other respects identical with the conductor 73 except for being shorter so that its bent contact and 74' normally engages the plate 55' and remains so engaged therewith for a variety of positions of the blocks 48' and 49 relatively to each other. The steam line 19 is provided with a normally open, solenoid-controlled safety valve of suitable construction corresponding to the valve 76 except that the solenoid is de-energized to open the valve, and since the contact member 74' normally engages the plate 55' to maintain a closed circuit (the hand switch 77 being closed), the solenoid remains energized to maintain the valve normally open. When, however, the contact member 74' moves out of engagement with the plate 55', the circuit through the solenoid of the safety valve is broken and the valve closes to stop the transmission of steam and so stop the engine because the solenoid is de-energized. The structure shown in Figs. 1 through 5 and described above need not be changed in any other respect for just as movement of the slide block 48 to the right or left in Fig. 3 either manually or mechanically (automatically), as described above, decreases or increases, as the case may be, the spacing between the contact member 74 and the plate 55, so does movement of the slide block 48' to the right or left in Fig. 6 either manually or mechanically (automatically) decrease or increase, as the case may be, the distance along the plate 55' which the contact member 74' can move and remain in engagement therewith before leaving it and so breaking the circuit to effect stopping of the engine.

In describing the structure shown in Figs. 1 through 6, the position of the calibrations 88 was discussed before taking up the automatic adjustment of the switches 43 or 43' upon movement of the hand wheel 41. It will be appreciated, however, that depending upon the nature of the power driven device and upon the means employed for regulating and varying its speed, the switch 43 or 43' and the governor 84 would be constructed and connected, and the rod 62 would be calibrated, for stopping the device at the desired overspeed limits as determined by the amount of movement of the means employed to regulate and vary the speed of the device the desired amounts.

The power driven device illustrated in Figs. 1 and 2 is the steam engine 15 and the safety valve 76 functions to stop the engine by cutting off the transmission of steam in the line 19 to the engine. Corresponding structure would be used where the power driven device is a water wheel. But where the power driven device is a rotor-provided one, such as a motor, for example, the power transmission line thereto would be adapted to conduct electricity. In such a case there would be employed a solenoid-controlled circuit breaker for the line as a substitute for the solenoid-controlled valve 76 in Figs. 1 and 2.

In view of the foregoing it is believed that little more need be said concerning the structure and operation of the constructions shown in Figs. 1 through 6. So long as the engine governor 23 functions as it should, the switch 43 or 43' will not effect closure of the safety valve in the line 19, whether the circuit used be a normally open one or a normally closed one, respectively. But if the governor 23 ceases to function for any reason, and the engine begins to overspeed, the control of the switch 43 or 43' by the engine shaft 17 independently of the governor 23 results in the closure of the safety valve, as described above, upon the speed of the flywheel 16 and of the shaft 17 reaching the overspeed limit to which adjustment of the hand wheel 41 has automatically effected switch adjustment. The same stopping of a power driven device will take place, and for the same reason, when the location of the slide block 48 or 48' is manually controlled and the switch 43 or 43' is used either with a given power driven device having means to regulate or vary its speed to any one of a plurality of normal operational speeds or with any one of a plurality of power driven devices each having a different normal operational speed. Upon a stopping of the power driven device as set forth above, the manual steam valve 20, for example, is closed so that the cause of overspeeding may be ascertained and corrected. The cessation of rotation of the governor 84 resulting from engine stoppage will in the meantime have resulted in the slide block 49 resuming its Fig. 3 or Fig. 6 position so that the solenoid of the safety valve in the line 19 is de-energized again or is energized again, as the case may be, to open the safety valve. The hand switch 77 is preferably turned off when the engine is stopped, but upon its being turned on after the cause of overspeeding is corrected and the valve 20 opened, the illustrated embodiment of the present invention is again ready to perform its stopping function.

In the embodiment of the present invention shown in Figs. 7 through 10 a fluid pressure operated stop means or overspeed trip is provided to throw a power driven device out of operation upon a tendency of a moving part thereof to race, i. e., to exceed a predetermined operational speed. For illustrative purposes only the power driven device indicated in Fig. 7 is the engine 15 of Figs. 1 and 2, as evidenced by the engine shaft 17, steam chest 18, valve housing 21, and governor 23, and for still further illustrative purposes only the speed of the governor 23 and therefore of the engine 15 is shown as regulable by the regulator 29 of Fig. 2.

The fluid pressure operated stop means of Figs. 7 through 10 is provided with a standard 93 located adjacent the standard 30 and supporting at its top an adjustable valve construction indicated generally by the numeral 94 and having an upper eared housing member 95 and a lower eared housing member 96 bolted together to form a longitudinal cylindrical passage 97 open at both ends. Mounted for reciprocation in the passage 97 is a hollow cylinder 98 having a closed left end 99 (viewing Fig. 8) provided with an external bracket 100 and with a vent 101, and received within the cylinder 98 for coaction therewith is a cylindrical slide valve member 102 having an annular recess 103 adjacent the end thereof opposite the closed end 99 of the cylinder 98, circumferential packing rings 104 and 105 at the opposite sides of the recess 103, and a rod 106 centrally secured in and outstanding from its right hand end (viewing Fig. 8). The housing members 95 and 96 have semi-circular bosses 107 and 108, respectively, at their left ends (viewing Figs. 8 and 10) to form an extension of the cylindrical passage 97, and mounted in the boss 107 for engagement with the cylinder 98 to hold it in any one of a plurality of positions longitudinally of the passage 97 is a set screw 109. The structure of the cylinder 98 is completed by spaced ports 110 and 111 (Figs. 8 and 9) formed in the cylinder intermediate its ends and by calibration marks 112 (Fig. 7) formed on its external surface adjacent its closed end. These calibration marks may be associated with numbers (not shown) and correspond in function to the calibration marks 88 in Fig. 3, as is explained below.

It is the function of the valve 94 to stop the engine 15 by causing its supply of steam to be cut off, and to this end the embodiment of the present invention shown in Figs. 7 through 10 contemplates the presence in the steam line 19 of a normally open, fluid pressure operated safety valve 113 which may be of any suitable construction, and means operatively connecting the valve 94 and the safety valve 113 to cause the latter to close upon being subjected to the influence of fluid pressure. Broadly speaking, this operative connection may take any form suitable for the purpose and the safety valve may be closed by direct pressure or by suction, but it is preferred in the embodiment of the present invention shown in Figs. 7 through 10 to close the safety valve 113 by the pressure of steam from the line 19 under the control of the valve 94.

For this purpose the lower valve housing member 96 is provided intermediate its ends and at the opposite sides of the longitudinal center of its cylindrical surface 97 portion with elongated recesses or chambers 114 and 115 having ports 116 and 117, respectively, leading to the opposite exterior sides of the housing member 96, and connecting the steam line 19 with the port 117 and chamber 115 is a line 118, while connecting the chamber 114 and the port 116 with the safety valve 113 is a line 119. The chambers 114 and 115 may be of identical size, and packing 120 located in each engages the cylinder 98 to prevent the escape of steam from around the chambers and out the opposite ends of the cylindrical passage 97. As indicated by comparison of Figs. 8 and 9, the length of the elongated chambers 114 and 115 is considerably greater than the width of the cylinder ports 110 and 111 so that the latter remain in communication with the former during a considerable movement of the cylinder 98 longitudinally of the passage 97 to either side of its center, and it is contemplated in the operation of the illustrated embodiment of the present invention that the ports 110 and 111 remain in communication with the chambers 114 and 115, respectively, regardless of the location of the cylinder 98 in the passage 97. Also as indicated by comparison of Figs. 8 and 9, the length of the slide valve member 102 is such as to normally seal the port 110 from the port 111, so that steam in the line 118, port 117, chamber 115 and port 111 can not pass to the port 110, chamber 114, port 116, line 119, and so to the safety valve 113 to close it. But it will be appreciated that upon a sliding of the valve member 102 to the right (viewing Fig. 8) a sufficient amount, the annular recess 103 therein will be in registry with the ports 110 and 111, thereby putting them in communication with each other and providing a through passage for steam in the line 118 to flow through the valve 94 and the line 119 to close the safety valve 113 and so stop the engine 15 by stopping the transmission of steam thereto. It will be appreciated that when the ports 110 and 111 are thus in communication, the packing rings 104 and 105 prevent the escape of steam from between the cylinder 98 and the valve member 102.

The present invention contemplates that the registry of the annular recess 103 of the valve member 102 with the ports 110 and 111 be effected by means controlled by the power driven device, and while broadly speaking this means may take any form suitable for the purpose, it is preferred to effect this result in the embodiment of the present invention shown in Figs. 7 through 10 by a governor construction controlled by the engine 15 and operatively connected to the valve member 102. To this end the standard 93 supporting the valve 94 may be provided with an outstanding arm 121 the free end of which forms a horizontal bearing for a shaft 122 on the outer end of which a pulley 123 is secured, this pulley being driven by a belt 124 passing around the engine shaft 17, as indicated in Fig. 7. On the inner end of the shaft 122 there is secured a collar 125 forming one end of a flyball governor 126 shown merely for illustrative purposes only as being of a leaf-spring type, and a sleeve 127 forming the other end of the governor 126 is received loosely by the free end portion of the slide valve member rod 106 for rotation thereabout, spaced collars 128 and 129 being secured to the rod 106 at the opposite sides of the sleeve 127, as best shown in Fig. 8. It will be appreciated that the above elements 121 through 129, inclusive, correspond in structure to the elements 79 through 87, inclusive, in Figs. 2 and 3, but it is desirable that the governor 126 be of heavier construction than the governor 84 so as to be capable of exerting greater pulling and pushing force on the rod collars 129 and 128, respectively.

With the above-described construction, it will be seen that in a manner corresponding to the structure shown in Figs. 1 through 6, rotation of engine shaft 17 is transmitted by the belt 124 to the pulley 123, that rotation of the pulley 123 causes rotation of the governor 126, and that the speed of rotation of the governor 126 is determined directly by the speed of rotation of the engine shaft 17. The centrifugal action of the flyballs of the governor 126 resulting from its rotation causes the flyballs to move away from their axis of rotation and so cause the governor sleeve 127 to move away from the housing members of the valve 94 (to the right, viewing Fig. 8) in engagement with the rod collar 129, thereby drawing the rod 106 and the slide valve member 102 with it. Since the governor 126 is of a leaf-spring type, upon any decrease in its rotative speed its sleeve 127 moves to the left (viewing Fig. 8) and so moves the slide valve member 102 to the left by engagement of the sleeve 127 with the collar 128, and the slide member 102 always returns to the same position within the cylinder 98 whenever the governor 126 ceases to rotate, i. e., when the engine 15 is not in operation.

Considering the cylinder 98 and the coacting slide valve member 102 as having the relative positions indicated in Fig. 8, and also considering the governor 126 as being either at rest (the engine 15 being stopped) or rotating at a given speed (the engine being in operation), it may well be that upon a starting of the engine, or upon an increase in its speed if already in operation, the amount of movement to the right (viewing Fig. 8) of the valve member 102 effected by the rotating governor 126 will be insufficient to cause registry of the annular recess 103 with the ports 110 and 111, and if such a condition comes into being or exists, as the case may be, the ports 110 and 111 will remain sealed from each other and as a consequence no steam passes through the line 119 to close the safety valve 113. If, however, the speed of the engine 15 and the shaft 17 be increased to an extent sufficient to cause the centrifugal action of the governor 126 to draw the rod 106 far enough out of the valve 94 so that the annular recess 103 places the ports 110 and 111 in communication, there takes place the above-described flow of steam from the line 118 through the valve 94 and through the line 119 to close the safety valve 113 and so stop the engine. As the speed of the engine 15 determines the speed of rotation of the governor 126, the placing of the ports 110 and 111 in communication by the annular recess 103 in the valve member 102 is controlled by the engine itself, and it will be noted that as in the case of the corresponding structure in the Figs. 1 through 6 embodiment of the present invention this control is effected independently of the governor 23.

Looking at the valve construction shown in Fig. 8 in a different light, but in view of the foregoing remarks, the fact that the governor 126 must rotate at a given (predetermined) speed to effect movement of the valve member 102 and therefore of the annular recess 103 from the position thereof indicated in Fig. 8, for example, to a position in which the recess 103 places the ports 110 and 111 in communication, it will be seen that by varying the position of the cylinder 98 with respect to the Fig. 8 position of the valve member 102, the distance between the annular recess 103 and the ports 110 and 111 may be varied, thereby of necessity causing the latter to be placed in communication with each other at different speeds of the governor 126 since the extent of movement of the valve member 102 varies directly with variations in the speed of the governor 126. Thus, just as in the case of the corresponding slide block structure shown in Figs. 1 through 6, by varying the position of the cylinder 98 in the cylindrical passage 97, the valve 94 as a whole can be adjusted, i. e., conditioned, to effect closing of the safety valve 113 at any one of a plurality of selected speeds of the governor 126, and since the speed of the governor 126 depends directly upon the speed of the engine 15, the valve 94 as a whole can be adjusted, i. e., conditioned, to effect closing of the safety valve 113 at any one of a plurality of selected speeds of the engine 15.

The calibration marks 112 on the cylinder 98 adjacent its closed end 99 have the same function as do the overspeed limit indicating calibration marks 88 on the rod 62 extending from the slide block 48 in Fig. 3, and are located on the cylinder 98 in a manner corresponding to the empirical manner above-stated for locating the calibration marks 88 on the rod 62. Further comment on the calibration marks 112 will therefore not be made, except to state that while any suitable means may be employed for registry with these calibrations, in the embodiment of the present invention shown in Fig. 7 these calibrations are adapted to register with the mouth of the extension of the cylindrical passage 97 formed by the semi-circular bosses 107 and 108, and that like the calibrations 88, the calibrations 112 are given the locations shown in Fig. 7 merely for illustrative purposes.

In the structure so far described the position of the cylinder 98 is adjusted as the result of manual movement of the bracket 100, and the cylinder is maintained in a given position of adjustment by tightening the set screw 109 (Fig. 8) against the cylinder. By reason of this construction and that described above it will thus be seen that the embodiment of the present invention shown in Figs. 7 through 10 also permits the achievement of the first two of the three principal objects of the present invention. But it is preferred, as in the case of the embodiments of the present invention shown in Figs. 1 through 6, to provide means for operatively connecting the above-described valve and governor construction with the device itself so that the third object of the present invention may also be achieved by the Figs. 7 through 10 embodiment.

The means for achieving this automatic adjustment of the valve 94 may take any form suitable for the purpose, but one such means may comprise an operative connection with the mechanism for shifting the speed regulator belt 31, as in the case of the Figs. 1 through 6 embodiments of the present invention, i. e., where a power driven device such as the engine 15 is employed. To this end the standard 93 may be provided with an arm 130 corresponding in function to the arm 89 (Fig. 2) and having the bell crank lever 90 pivotally mounted thereon in upright position. The arm of the lever 90 opposite the valve 94 is pivotally connected to one end of a link 131 corresponding in function to the link 91 and having its other end pivotally connected to the bracket 100 on the cylinder end 99, and the arm of the lever 90 opposite the engine 15 is pivotally connected to the link 92 which is itself pivotally connected to the arm 37 of the regulator 29 as described above and as illustrated in Fig. 7 as well as in Fig. 2. With this construction, rotation of the hand wheel 41 in one direction or the other causes movement of the arm 37 longitudinally of the cones 28 and 32 and as a consequence movement of the link 92, swinging of the bell crank lever 90, movement of the link 131, and movement of the bracket 100 and of the cylinder 98, and as the turning of the hand wheel 41 necessarily effects a decrease or an increase in the spacing of the annular recess 103 and the ports 110 and 111 by reason of the above-described construction in a manner corresponding to that in which the turning of the hand wheel 41 effects a decrease or an increase in the spacing between the contact member 74 and the plate 55 in Fig. 3 or between the contact member 74' and the plate 55' in Fig. 6, it is not deemed necessary to describe in further detail how regulation or varying of the speed of the engine 15 by regulating or varying the speed of its governor 23 as set forth above automatically adjusts, i. e., conditions, the valve 94 so that it will effect closure of the safety valve 113 upon the engine 15 reaching a given overspeed limit.

Figure 12:
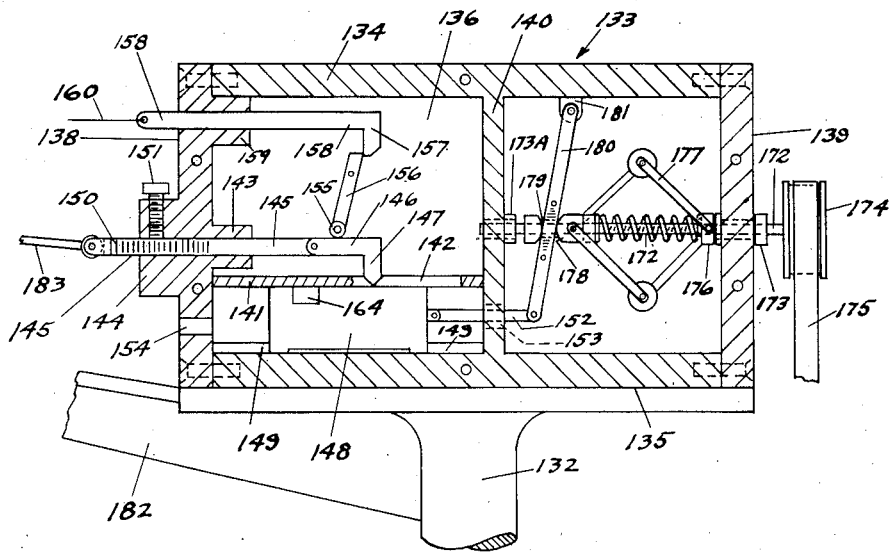
Fig. 12 is an enlarged detail view in side elevation, certain parts being cut away, of the adjustable trip mechanism of the Fig. 11 embodiment of the present invention.

In the embodiment of the present invention shown in Figs. 11 and 12 a mechanically operated stop means or overspeed trip is provided to throw a power driven device out of operation upon a tendency of a moving part thereof to race, i. e., to exceed a predetermined operational speed. For illustrative purposes only the power driven device indicated in Fig. 11 is the engine 15 of Figs. 1, 2, and 7 as will be apparent from Fig. 11, and for still further illustrative purposes only the speed of the governor 23 and therefore of the engine 15 is shown as regulable by the regulator 29 of Figs. 2 and 7.

The mechanically operated stop means of Figs. 11 and 12 is provided with a standard 132 located adjacent the standard 30 and supporting at its top a trip mechanism indicated generally by the numeral 133 and shown as comprising a box-like housing having a top 134, bottom 135, side walls 136 and 137, and ends 138 and 139, these elements being shown merely for illustrative purposes as being plates adapted to be secured together by screws. The housing formed by these plates is provided with a vertical partition 140 and to one side thereof with a horizontal partition 141 having a longitudinal slot 142. On its inner face the end plate 138 is provided with a boss 143 located above the partition 141, while on the outer face of the end plate 138 there is provided a second boss 144, and a through passage formed in these three elements receives a slide rod 145 on the inner end of which an extension in the form of a dog 146 having a downwardly directed tooth 147 is loosely pivoted for swinging movement in a vertical plane. As indicated in Fig. 12, the end of the tooth 147 is located in the slot 142 for movement therealong upon reciprocation of the rod 145, and the tooth 147 is normally supported by the upper surface of a coacting slide block 148 resting on the housing bottom 135 and adapted to be reciprocated underneath the slot 142 between the end plate 138 and the partition 140, ways 149 (only one shown in Fig. 12) being provided at the opposite sides of the block 148 to insure its reciprocation in a straight line. Along it outer end portion the slide rod 145 is provided with calibration marks 150 which may be associated with numbers (not shown), a set screw 151 being mounted in the boss 144 and adapted to engage the slide rod 145 to hold it in any one of a plurality of positions, as is explained below, and the slide block 148 is pivotally connected at its right end (viewing Fig. 12) to a link 152 which extends through a passage 153' formed in the lower portion of the vertical partition 140. The end plate 138 is preferably provided with a vent 154 beneath the level of the partition 141, and the tooth 147 is pressed in engagement with the top surface of the slide block 148 by a roll 155 which engages the dog 146 and is journaled on the lower end of a suitably pivoted lever 156 the upper end of which is engaged by a downwardly directed detent 157 formed on the inner end of a rod 158 slidably received in a passage formed in the upper portion of the end plate 138 and in a boss 159 extending inwardly therefrom. Pressure on the dog 146 to maintain the tooth 147 engaged with the coacting slide block 148 may be provided by the influence of a weight W which is suspended from one end of a cord 160, this cord passing over suitably journaled pulleys 161, 162, and 163 and its other end being attached to, and by reason of the weight W exerting an outward pull on, the outer end of the slide rod 158 which extends outwardly of the housing of the trip mechanism 133. The structure within the chamber located between the end plate 138 and the vertical partition 140 is completed by a cavity 164 formed in the upper portion of the slide block 148 adjacent the end opposite that to which the link 152 is pivoted, and the cavity 164 is so located in the block 148 as to underlie the slot 142. By reason of this construction it will be seen that upon a sliding of the block 148 a sufficient extent to the right (viewing Fig. 12) to cause the cavity 164 to underlie the tooth 147, the pressure exerted thereon by the weight W acting through the roll 155 will cause the tooth 147 to swing downwardly into the cavity 164, but inspection of Fig. 12 will show that the portion of the upper surface of the slide block 148 between its pivoted end and the cavity 164 is of sufficient extent to permit a considerable sliding movement of the block 148 before the cavity underlies the tooth 147 and permits its downward swinging.

It is the function of the trip mechanism 133 to stop the engine 15 by causing its supply of steam to be cut off, and to this end the embodiment of the present invention shown in Figs. 11 and 12 contemplates the presence in the steam line 19 of a normally open, lever-operated safety valve 165 which may be of any suitable construction, and means operatively connecting the trip mechanism 133 and the safety valve 165 to cause the latter to close. Broadly speaking this operative connection may take any form suitable for the purpose and the safety valve 165 may be closed by a spring construction, but it is preferred to close the valve 165 by means of the weight W acting under the control of the trip mechanism 133. To this end the valve lever 166, which is normally in valve-open position, is attached to one end of a depending cord 167 the other end of which is secured to a weight W' which rests on a slide 168 supported beneath the lever 166 by a suitably mounted bracket 169, and the slide 168 is attached to one end of a cord 170 which passes over a suitably journaled pulley 171 and has its other end attached to the weight W. By reason of this construction it will be seen that so long as the tooth 147 of the dog 146 rests upon the upper surface of the coacting slide block 148, thereby preventing a swinging of the lever 156 and a release of the detent 157, the valve lever 166 will remain in valve-open position since the slide 168 remains therebeneath to support the weight W'. When, however, the slide block 148 is moved sufficiently to the right (viewing Fig. 12) to bring the cavity 164 beneath the tooth 147, the pressure exerted against the tooth by the roll 155 under the influence of the weight W causes the tooth 147 to swing downwardly, thereby permitting a swinging of the pivoted lever 156 and hence release of the detent 157 and movement of the slide rod 158 to the left (viewing Fig. 12) so that the weight W descends by gravity and so pulls the slide 168 from beneath the weight W', whereupon the weight W' itself descends by gravity and swings the valve lever 166 to valve-closed position to shut off the transmission of steam in the line 19 to the engine 15. When the dog 146 swings downwardly, the detent 157 on the slide rod 158 clears the upper end of the lever 156, and the slide rod 158 is sufficiently long and the slide 168 is sufficiently short so that the latter is pulled clear of the weight W' when the detent 157 is released.

The present invention contemplates that movement of the slide block 148 to cause its cavity 164 to underlie the coacting tooth 147 and so effect downward movements of the weights W and W' as set forth above shall be effected by means controlled by the power driven device, and while broadly speaking this means may take any form suitable for the purpose, it is preferred to effect this result in the embodiment of the present invention shown in Figs. 11 and 12 by a governor construction controlled by the engine 15 and operatively connected to the slide block 148. To this end the opposite ends of a horizontal shaft 172 are journaled in the vertical partition 140 and the end plate 139, respectively, a portion of the shaft 172 extending outwardly of the end plate 139 and there receiving a retaining collar 173 and also a pulley 174 secured thereon, this pulley being driven by a belt 175 passing around the engine shaft 17 as indicated in Fig. 11. Adjacent the vertical partition 140 the shaft 172 is provided with a retaining collar 173A, and adjacent a boss formed on the inner surface of the end plate 139 there is secured to the shaft 172 a collar 176 forming one end of a flyball governor 177 shown merely for illustrative purposes as being of a spring-loaded type. A sleeve 178 forming the other end of the governor 177 is received loosely by the shaft 172 for rotation thereabout, and as indicated in Fig. 12, the governor sleeve 178 has a central annular recess 179 to receive the outwardly bowed opposite side portions of a lever 180 which may be in two pieces riveted together, the upper end of the lever 180 being pivotally connected to an ear 181 depending from the lower face of the housing top 134 and the lower end of the lever 180 being pivotally connected to the link 152 attached to the slide block 148.

With the above-described construction it will be seen that in a manner corresponding to the operation of the structures shown in Figs. 1 through 6 and in Figs. 7 through 10, rotation of the engine shaft 17 is transmitted by the belt 175 to the pulley 174, that rotation of the pulley 174 causes rotation of the governor 177, and that the speed of rotation of the governor 177 is determined directly by the speed of rotation of the engine shaft 17. Inasmuch as the governor collar 176 is fixed to the shaft 172, the centrifugal action of the flyballs of the governor 177 resulting from their rotation causes the flyballs to move away from their axis of rotation, and so causes the governor sleeve 178 to move away from the partition 140 to the right (viewing Fig. 12), thereby causing the sleeve 178 to swing the lever 180, which lever swinging in turn pulls the link 152 and the slide block 148 to the right. Since the governor 177 is of a spring-loaded type, upon any decrease in its rotative speed its sleeve 178 moves to the left (viewing Fig. 12) and so swings to the left the lever 180, this lever swinging causing the link 152 and the slide block 148 also to move to the left, and the slide block 148 always returns to the same position within the chamber located between the end plate 138 and the vertical partition 140 whenever the governor 177 ceases to rotate, i. e., when the engine 15 is not in operation.

Considering the slide block 148 and the coacting slide rod 145 with the attached dog 146 as having the relative positions indicated in Fig. 12, and also considering the governor 177 as being either at rest (the engine 15 being stopped) or rotating at a given speed (the engine being in operation), it may well be that upon a starting of the engine, or upon an increase in its speed if already in operation, the amount of movement to the right (viewing Fig. 12) of the slide block 148 effected by the rotating governor 177 will be insufficient to cause the cavity 164 in the slide block 148 to underlie the tooth 147 of the dog 146, and if such a condition exists or comes into being, as the case may be, the tooth 147 will remain up by engagement with the upper surface of the block 148 and as a consequence the detent 157 of the slide rod 158 will not be released by the lever 156 and the weights W and W' will remain in their Fig. 12 positions, i. e., will not fall. If, however, the speed of the engine 15, and therefore of the shaft 17, be increased to an extent sufficient to cause the centrifugal action of the governor 177 to swing the lever 180 sufficiently to draw the link 152 and the slide block 148 far enough to the right (viewing Fig. 12) so that the cavity 164 underlies the tooth 147, the tooth swings into the cavity 164 when this underlying takes place, and there results the release of the detent 157 by the upper end of the lever 156 and the consequent fall of the weights W and W' and downward (valve-closing) swinging of the lever 166 of the safety valve 165 so that this valve is closed and the engine 15 stopped. As the speed of the engine 15 determines the speed of rotation of the governor 177, the drawing of the slide block 148 to the right (viewing Fig. 12) is controlled by the engine itself, and as in the case of the corresponding structure in Figs. 1 through 6 and in Figs. 7 through 10, it will be seen that this control is effected independently of the engine governor 23.

Looking at the trip mechanism shown in Fig. 12 in a different light but in view of the foregoing remarks, the fact that the governor 177 must rotate at a given (predetermined) speed to effect movement of the slide block 148 and therefore of the cavity 164 from the position thereof indicated in Fig. 12, for example, to a position in which the cavity 164 underlies the tooth 147, it will be seen that by varying the position of the slide rod 145 and therefore of the connected dog 146 with respect to the Fig. 12 position of the slide block 148, the distance between the cavity 164 and the tooth 147 can be varied, thereby of necessity causing the latter to swing downwardly into the former at different speeds of the governor 177 since the extent of movement of the slide block 148 varies directly with variations in the speed of the governor 177. Thus, just as in the case of the corresponding structure shown in Figs. 1 through 6 and in Figs. 7 through 10, by varying the position of the slide rod 145 and connected dog 146, the trip mechanism 133 can be adjusted to effect closing of the safety valve 165 at any one of a plurality of selected speeds of the governor 177, and since the speed of the governor 177 depends directly upon the speed of the engine 15, the trip mechanism 133 can be adjusted, i. e., conditioned, to effect closing of the safety valve 165 at any one of a plurality of selected speeds of the engine 15.

The calibration marks 150 on the slide rod 145 have the same function as do the overspeed limit indicating calibration marks 88 on the rod 62 in Fig. 3 and the calibration marks 112 on the cylinder 98 in Fig. 7, and they are located on the slide rod 145 in a manner corresponding to the empirical manner above stated for locating the calibration marks 88 on the rod 62. Further comment on the calibration marks 150 will not therefore be made, except to state that while any suitable means may be employed for registry with these calibrations, in the embodiment of the present invention shown in Figs. 11 and 12 these calibrations are adapted to register with the mouth of the passage in the boss 144 and that the calibrations 150 are given the locations shown in Fig. 12 merely for illustrative purposes.

In the structure so far described the position of the slide rod 145 and its connected dog 146 is adjusted as a result of manual movement of the side rod, and it is maintained in a given position of adjustment by tightening the set screw 151 thereagainst. By reason of this construction and that described above it will thus be seen that the embodiment of the present invention shown in Figs. 11 and 12 also permits the achievement of the first two of the three principal objects of the present invention. But, it is preferred, as in the cases of the embodiments of the present invention shown in Figs. 1 through 6 and in Figs. 7 through 10, to provide means for operatively connecting the above-described trip mechanism and governor construction with the device itself so that the third object of the present invention may also be achieved by the Figs. 11 and 12 embodiment.

The means for achieving this automatic adjustment of the trip mechanism 133 may take any form suitable for the purpose, but one such means may comprise an operative connection with the mechanism for shifting the speed regulator belt 31, as in the cases of the Figs. 1 through 6 and Figs. 7 through 10 embodiments of the present invention, i. e., where a power driven device such as the engine 15 is employed. To this end the standard 132 may be provided with an arm 182 corresponding in function to the arm 89 (Fig. 2) and arm 130 (Fig. 7) and having bell crank lever 90 pivotally mounted thereon in upright position. The arm of the lever 90 opposite the trip mechanism 133 is pivotally connected to one end of a link 183 corresponding in function to the links 91 and 131, the other end of the link 183 being pivotally connected to the end of the slide rod 145 outstanding from the end plate 138, and the arm of the lever 90 opposite the engine 15 is pivotally connected to the link 92 which is itself pivotally connected to the arm 37 of the regulator 29 as described above and as illustrated in Fig. 11 as well as in Figs. 2 and 7. With this construction, rotation of the hand wheel 41 in one direction or the other causes movement of the arm 37 longitudinally of the cones 28 and 32 and as a consequence movement of the link 92, swinging of the bell crank lever 90, movement of the link 183, and movement of the slide rod 145 and dog 146, and as the turning of the hand wheel 41 necessarily effects a decrease or an increase in the spacing between the cavity 164 and the tooth 147 by reason of the above-described construction in a manner corresponding to that in which turning of the hand wheel 41 effects a decrease or an increase in the spacing between the contact member 74 and the plate 55 in Fig. 3, or between the contact member 74' and the plate 55' in Fig. 6, or between the annular recess 103 and the ports 110 and 111 in Figs. 8 and 9, it is not deemed necessary to describe in further detail how regulation or varying the speed of the engine 15 by regulating or varying the speed of its governor 23 as set forth above automatically adjusts, i. e., conditions, the trip mechanism 133 so that it will effect closing of the safety valve 165 upon the engine 15 reaching a given overspeed limit.

Upon a stopping of the power driven device as set forth above, to prevent overspeeding, the manual steam valve 20, for example, is closed so that the cause of overspeeding may be ascertained and corrected. Before the valve 20 is opened, however, so that the engine may resume operation, the side plate 136 of the housing of the trip mechanism 133 may be removed temporarily, whereupon, after replacement of the slide 168 beneath the weight W' and the turning of the lever 166 to valve-open position, the slide rod 158 may be pushed inwardly of the trip mechanism 133 and the dog 146 lifted to swing the upper end of the lever 156 against the detent 157 to hold the slide rod 158 in its inward or Fig. 12 position. The lifting of the dog 146 withdraws its tooth 147 from the cavity 164, whereupon the spring loading of the governor 177 results in the slide block 148 moving to the left (viewing Fig. 12) so that the tooth 147 rests on the slide block 148 and the dog 146 presses against the roll 155 to cause the lever 156 to maintain its engagement with the detent 157 to hold the slide rod 158 in place. Upon replacement of the side plate 136 and opening of the valve 20 after the cause of overspeeding has been corrected, the embodiment of the present invention illustrated in Figs. 11 and 12 is again ready to perform its stopping function.

Nothing herein explained is to be interpreted as limiting the present invention, as compared to particular physical embodiments thereof, in the scope of its application to use in connection with the particular structural details herein selected for purposes of explanation and illustration. The particulars of construction herein set forth are well suited to the particular physical embodiments of the invention which have been shown, but the invention is not limited either to these embodiments or to the features of each conjointly or to these particulars, and it is to be understood that they may be variously modified within the skill of the artisan without departing from the true scope of the actual invention, characterizing features of which are set forth in the following claims which intentionally employ generic terms and expressions that are inclusive in meaning of various modifications and embodiments.

What is claimed as new is:

1. In an apparatus for preventing overspeeding of a power driven means connected to a line for the transmission of power thereto and provided with means movable from one position to any one of a plurality of different positions for varying the speed of the power driven means to any one of a plurality of speeds, respectively: the combination with a device adapted to stop the transmission of power through the line; a pair of coacting movable members; means for supporting the members so that the first may be moved to any one of a plurality of different coacting positions with respect to the second; means for operatively connecting the second member with said device through coaction with the first member when said first member is in any one of said positions so that upon movement of the second member said device is actuated to stop the transmission of power through the line; and means for operatively connecting the second member with the power driven means for control of the movement of the second member by the power driven means; of means for operatively connecting the speed varying means with the first member to effect movement of said first member when the speed varying means is moved.

2. In an apparatus for preventing overspeeding of a power driven means connected to a line for the transmission of power thereto and provided with means movable from one position to any one of a plurality of different positions for varying the speed of the power driven means to any one of a plurality of speeds, respectively: the combination with a device adapted to stop the transmission of power through the line; a pair of coacting movable members; means for supporting the members so that the first may be moved to any one of a plurality of different coacting positions with respect to the second; means for operatively connecting the second member with said device through coaction with the first member when said first member is in any one of said positions so that upon movement of the second member said device is actuated to stop the transmission of power through the line, said means for operatively connecting the second member with the device through coaction with the first member including a governor operatively connected to the second member for moving said second member; and means for operatively connecting the governor with the power driven means for control of the governor by the power driven means; means for operatively connecting the speed varying means with the first member to effect movement of said first member when the speed varying means is moved.

3. In an apparatus for preventing overspeeding of a fluid pressure operated device connected to a fluid pressure line and provided with means movable from one position to any one of a plurality of different positions for varying the operational speed of the device to any one of a plurality of speeds, respectively: the combination with a normally open valve for the line; and means controlled by the fluid pressure operated device for closing the valve to stop the device when the speed of said device increases a predetermined amount over a given operational speed as determined by the speed varying means; of means for operatively connecting the speed varying means with the valve closing means to condition the latter for operation at said predetermined increased speed of the device.

4. In an apparatus for preventing overspeeding of a fluid pressure operated device connected to a fluid pressure line and provided with means movable from one position to any one of a plurality of different positions for varying the operational speed of the device to any one of a plurality of speeds, respectively: the combination with a normally open valve for the line; and means for closing the valve to stop the fluid pressure operated device when the speed of said device increases a predetermined amount over a given operational speed as determined by the speed varying means, said means for closing the valve including a member movable to any one of a plurality of different positions of operation; of means for operatively connecting the speed varying means with said member to effect movement of said member when the speed varying means is moved.

5. In an apparatus for preventing overspeeding of a fluid pressure operated device connected to a fluid pressure line and provided with means movable from one position to any one of a plurality of different positions for varying the operational speed of the device to any one of a plurality of speeds, respectively: the combination with a normally open valve for the line; and means for closing the valve to stop the fluid pressure operated device when the speed of said device increases a predetermined amount over a given operational speed as determined by the speed varying means, said means for closing the valve including two coacting members each movable with respect to the other and the movement of one of said members being controlled by the device; of means for operatively connecting the speed varying means and the other of said members to effect movement of said other member when said speed varying means is moved.

6. In an apparatus for preventing overspeeding of a fluid pressure operated device connected to a fluid pressure line and provided with means movable from one position to any one of a plurality of different positions for varying the operational speed of the device to any one of a plurality of speeds, respectively: the combination with a normally open valve for the line; and means for closing the valve to stop the fluid pressure operated device when the speed of said device increases a predetermined amount over a given operational speed as determined by the speed varying means, said means for closing the valve including a governor and two coacting members each movable with respect to the other, means for operatively connecting the governor with one of said movable members for moving said member, and means for operatively connecting the governor with the fluid pressure operated device for control of the governor by said device; of means for operatively connecting the speed varying means and the other of said movable members to effect movement of said other member when the speed varying means is moved.

7. In an apparatus for preventing overspeeding of a fluid pressure operated device connected to a fluid pressure line and provided with means movable from one position to any one of a plurality of different positions for varying the operational speed of the device to any one of a plurality of speeds, respectively: the combination with a valve for the line; electrically controlled means operating on a normally open circuit for maintaining the valve normally open; means adapted for control by the fluid pressure operated device for closing the circuit to close the valve and so stop the device when the speed of said device increases a predetermined amount over a given operational speed as determined by the speed varying means, said circuit closing means including two coacting switch members forming part of the circuit, each of said members being movable with respect to the other and one of said members being movable from one position for circuit-closing coaction with the second member, upon movement of the second member, to any one of a plurality of different positions each for circuit-closing coaction with the second member, upon movement of the second member and means for operatively connecting the second member with the fluid pressure operated device for control of the movement of the second member by the device when the speed of said device increases said predetermined amount; of means for operatively connecting the speed varying means with said one of the members to effect movement of said member when the speed varying means is moved.

8. In an apparatus for preventing overspeeding of a fluid pressure operated device connected to a fluid pressure line and provided with means movable from one position to any one of a plurality of different positions for varying the operational speed of the device to any one of a plurality of speeds, respectively: the combination with a normally open valve for the line adapted to close under the influence of fluid pressure; and means adapted for control by the fluid pressure operated device for subjecting the valve to the influence of fluid pressure to effect closure of said valve and so stop the device when the speed of said device increases a predetermined amount over a given normal operational speed as determined by the speed varying means, said valve closing means including a normally closed valve subjected to the influence of fluid pressure, a line from said normally closed valve to said normally open valve, a member movable to open the normally closed valve so that the normally open valve is subjected to the influence of fluid pressure to effect closure of said normally open valve, means for operatively connecting said movable member with the fluid pressure operated device for control of the movement of the movable member by the device when the speed of said device increases said predetermined amount, and a second member coactable with said movable member and movable to any one of a plurality of positions for coaction with said movable member; of means for operatively connecting the speed varying means with said second member to effect movement of said second member when the speed varying means is moved.

9. In an apparatus for preventing overspeeding of a fluid pressure operated device connected to a fluid pressure line and provided with means movable from one position to any one of a plurality of different positions for varying the operational speed of the device to any one of a plurality of speeds, respectively: the combination with a normally open, lever-operated valve for the line; and means adapted for control by the fluid pressure operated device for moving the lever to close the valve and so stop the device when the speed of said device increases a predetermined amount over said normal operational speed as determined by the speed varying means, said valve closing means including a lever-moving construction operatively connected to the valve, means for normally restraining the lever-moving construction from operation, means including a member movable to effect release of said restraining means, means for operatively-connecting said movable member with the fluid pressure operated device for control of the movement of the movable member by the device when the speed of said device increases said predetermined amount, and a second member coactable with said movable member and movable to any one of a plurality of positions for coaction with said movable member; of means for operatively connecting the speed varying means with the second member to effect movement of said second member when the speed varying means is moved.

WILLIAM J. PEARCE.

REFERENCES CITED

The following references are of record in the file of this patent:

UNITED STATES PATENTS

| Number | Name | Date |
|---|---|---|
| 1,117,430 | Nutter | Nov. 17, 1914 |
| 1,201,584 | Hindes | Oct. 17, 1916 |
| 1,226,073 | Herr | May 15, 1917 |
| 1,441,353 | Johnson | Jan. 9, 1923 |
| 1,483,536 | Warren | Feb. 12, 1924 |
| 1,537,694 | Rigsby | May 12, 1925 |
| 1,548,666 | Dickinson | Aug. 4, 1925 |
| 1,931,096 | Warner | Oct. 17, 1933 |
| 1,950,594 | Bryant | Mar. 13, 1934 |
| 2,009,418 | Schwendner | July 30, 1935 |
| 2,009,419 | Schwendner | July 30, 1935 |
| 2,239,602 | Gottlieb | Apr. 22, 1941 |